United States Patent [19]

Albrecht et al.

[11] Patent Number: 4,481,442
[45] Date of Patent: Nov. 6, 1984

[54] LOW-PRESSURE MERCURY VAPOR DISCHARGE LAMP, PARTICULARLY U-SHAPED FLUORESCENT LAMP, AND METHOD OF ITS MANUFACTURE

[75] Inventors: Wolfgang Albrecht, Berlin; Dieter Hofmann, Augsburg; Lutz Klein, Scheuring; Ernst Panofski, Augsburg, all of Fed. Rep. of Germany

[73] Assignee: Patent Treuhand-Gesellschaft fur elektrische Gluhlampen mbH, Munich, Fed. Rep. of Germany

[21] Appl. No.: 352,720

[22] Filed: Feb. 26, 1982

[30] Foreign Application Priority Data

Mar. 31, 1981 [DE] Fed. Rep. of Germany ....... 3112878

[51] Int. Cl.³ ........................ H01J 63/04; H01J 9/00
[52] U.S. Cl. ....................................... 313/493; 445/26
[58] Field of Search ................. 313/489, 493, 634; 445/26

[56] References Cited

U.S. PATENT DOCUMENTS

| 3,205,394 | 9/1965 | Ray | 313/489 |
|---|---|---|---|
| 3,634,716 | 1/1972 | Von Grabe | 313/493 |
| 4,300,073 | 11/1981 | Skwirut et al. | 315/53 |
| 4,319,162 | 3/1982 | Hoeh | 313/493 |

FOREIGN PATENT DOCUMENTS

| 830219 | 7/1949 | Fed. Rep. of Germany . |
|---|---|---|
| 2136012 | 2/1973 | Fed. Rep. of Germany . |
| 2835183 | 3/1979 | Fed. Rep. of Germany . |
| 2942846 | 5/1980 | Fed. Rep. of Germany . |
| 3011382 | 10/1980 | Fed. Rep. of Germany . |

Primary Examiner—Palmer Demeo
Assistant Examiner—Sandra L. O'Shea
Attorney, Agent, or Firm—Frishauf, Holtz, Goodman & Woodward

[57] ABSTRACT

To reduce the operating temperature of a U-shaped or multiple U-bent fluorescent lamp, the respective longitudinal and transverse sectional elements of the U-shaped lamp are so related that the outer generating line $M_Q$ of the individual transverse tube sections (4; 20, 21, 22) is substantially straight;

the diameter $D_{LQ}$ in the tube bends (5, 6; 23, 24, 25, 26, 27, 28) at the transition between the longitudinal tube sections (2, 3; 16, 17, 18, 19) and the respective transverse tube sections (4; 20, 21, 22) is larger than the diameter $D_Q$ of the individual transverse tube sections in the middle thereof, and the diameter $D_Q$ of the transverse tube section is at least as large as the diameter $D_L$ of the longitudinal tube sections;

a depression or dent can be formed at the center of the outer surface of the transverse tube section, and the corners of the transverse tube section can include additional heat dissipating material to further reduce the operating temperature.

20 Claims, 5 Drawing Figures

LOW-PRESSURE MERCURY VAPOR DISCHARGE LAMP, PARTICULARLY U-SHAPED FLUORESCENT LAMP, AND METHOD OF ITS MANUFACTURE

The invention relates to a low-pressure mercury vapor discharge lamp, and more particularly to a U-shaped fluorescent lamp made of a single-piece glass tube bent into generally U-shaped configuration, and to a method of its manufacture.

BACKGROUND

The lamp, basically, has a glass tube bent once or several times which consists of several straight, parallel longitudinal tube sections and at least one transverse tube section connecting individual longitudinal tube sections, with the two outer ends of the discharge tube being sealed and retaining electrode seals.

This structure provides a relatively compact low-pressure mercury vapor discharge light source. The sealed outer ends of the discharge tube may be provided with a base which permits the lamp to be used in a suitable fixture.

Low-pressure discharge lamps are known in which the tubular discharge envelope is simple and bent to U-shape (e.g. from the German Patent DE-PS No. 830,219, Japanese Utility Model Publication No. 36-27 470 and German Patent Disclosure Document DE-OS No. 28 35 183 to which U.S. Pat. No. 4,353,007 corresponds). Discharge lamps are also known in which the discharge tube is bent or folded several times (e.g. from the German Patent Disclosure Document DE-OS No. 29 42 846 and the German Patent Disclosure Document DE-OS No. 30 05 017). In some lamp constructions, the bent discharge envelope is surrounded by an outer bulb.

A common feature of all of these known lamps is that the individual bends of the discharge tube—between the longitudinal tube sections and the respective connecting transverse tube sections—extend at the outwardly facing tube surfaces in a uniform, gentle curve with a relatively large bending radius. The cross section of the discharge tube remains substantially equal over the individual tube sections, including the transition sections. The outer generating line of the respective transverse tube sections also is arcuate until it merges into the longitudinal tube sections.

In lamps of this type, above all in lamps of compact design, problems may occur with respect to maintaining the optimal mercury vapor pressure in the discharge envelope. It is well known that the mercury vapor pressure determines optimal conversion of the electrical power supplied to the lamp into radiation output emitted by the discharge; vapor pressure, in turn, is determined by the coldest spot or zone of the envelope wall. In the heretofore known lamps, the coldest spot is located in most cases at the U-shaped, bent transverse tube sections which are located furthest from the electrode ends which are hotter. Especially in the case of the compact lamp constructions, which may in addition be provided with an outer bulb, the normal wall temperature, which is approximately uniform over the respective transverse tube section appearing in the arcuate transverse tube sections is too high. To compensate, artificial cold spots are created at or adjacent these tube sections.

It has therefore been proposed, for example, in a lamp having a discharge tube bent three times to U-shape and an outer bulb (see German Patent Disclosure Document DE-OS No. 29 42 846) to provide a bulge at one of the transverse tube sections which projects through a planar member made, e.g. of glass, which extends transversely to the longitudinal tube sections. The planar member keeps the bulge at a relatively low temperature.

It has been proposed (see German Patent Disclosure Document DE-OS No. 30 11 382 to which U.S. Pat. No. 4,374,340 corresponds) to construct a low-pressure mercury vapor discharge lamp in which several parallel, staight, tubular parts are connected by tubular coupling members extending transversely to the said parts. These discharge envelopes are manufactured as individual tube members which are not interconnected originally. The coupling members have a smaller diameter than the longitudinal tube ports. The tubular coupling members extend at a certain distance from the respective adjacent ends of the longitudinal tube parts. The discharge does not reach the closed tube ends, so that they form the coldest spots of the discharge envelope.

THE INVENTION

It is an object to provide a compact low-pressure mercury vapor discharge lamp which is easily made, in which the discharge envelope consists of a single tube member bent once or several times and in which the required cold spots are readily obtained by a structural arrangement.

Briefly, the outer generating line $M_Q$ of the individual transverse tube sections is substantially straight, with the diameter $D_{LQ}$ in the tube bends at the transitions between the longitudinal tube sections and the respective transverse tube sections being larger than the diameter $D_Q$ of the individual transverse tube sections in the middle thereof. The diameter $D_Q$ is as large as or larger than the diameter $D_L$ of the longitudinal tube sections, wherein $D_L$, $D_Q$ and $D_{LQ}$ designate the external diameter of the respective tube sections. Preferably, the outer generating line $M_Q$ of the individual transverse tube sections is substantially perpendicular to the outer generating lines $M_L$ of the associated longitudinal tube sections.

The cold spots desired for optimal lamp operation thus occur in the two corners of approximately rectangular bends. The cold spots attain a temperature of about 40° C. as is shown by the temperature profile of FIG. 3. Higher temperatures appear both in the further sections of the longitudinal tube sections and towards the middle of the transverse tube sections. In order to provide particularly efficient cold spots at the tube bends, the latter may in addition be provided with a coating which dissipates the heat in the temperature range above 35° better than the glass material of the discharge envelope. Another or additional possibility is to provide a depression in the middle of the transverse tube sections at the generating surface facing outwards, i.e. at the outer generating line $M_Q$.

The outer generating line $M_Q$ can be straight or inclined. The line $M_Q$ will then form with the outer generating lines $M_L$ of the associated longitudinal tube sections an angle of less than 90° and an angle of over 90°, respectively. At the tube bend with the acute angle, the cold spot, determining the mercury vapor pressure, will form.

The diameter $D_Q$ of the transverse tube sections is preferably matched to the diameters $D_L$ of the longitudinal tube sections such that the ratio of $D_Q/D_L$ is from 1.1 to 1.3. Also, the diameter $D_{LQ}$ at the tube transitions, where the generating lines $M_Q$ and $M_L$ are slightly curved because of manufacturing requirements, should be so selected that a ratio of $D_{LQ}/D_Q$ of about 1.2 results. The clearance d between adjacent longitudinal tube sections which are connected by a transverse tube section is preferably as large as or smaller than the radius $D_L$ of these tube sections. The glass tube used, for instance, for a discharge envelope bent once has preferably an outer diameter $D_L$ of about 12 mm; the chosen clearance d between the two parallel longitudinal tubes is smaller than 6 mm. Since the longitudinal tube sections are derived from a single glass tube, they will have the same, i.e. essentially identical, nominal tube diameters.

Both a discharge envelope which is bent once so as to take a U-shape and a discharge envelope which is bent several times to form an undulating or meander shape may be manufactured with the features in accordance with the invention. Preferred embodiments are illustrated in the FIGS. 1a, 1b and 2a, 2b. The inner wall of the respective discharge tube is advantageously coated with a phosphor, for example with a customary three-line phosphor. A protective coating, for instance of silicon dioxide, may be provided between the wall of the discharge envelope and the phosphor coating. The outer ends of the tubular discharge envelope are provided with pinch seals which in the finished lamp are surrounded by a base member.

The following manufacturing process has proved useful in the manufacture of such discharge envelopes. An initially straight glass tube is heated at its central portion, until the central portion of the tube is brought to softening temperature. The tube portions at the sides of the now soft center portion are then bent towards one another until the longitudinal tube sections are aligned parallel to one another. Then, the tube bent to U-shape, that is, essentially the soft center portion and the transitions to the longitudinal tube sections is inserted into a mold, while a gas, which may be air, is blown into the tube through the tube ends. This operation is the essential part of the process; it is akin to blow-molding. The mold is so designed that a discharge envelope as described will result. If desired, further portions of the tube may be bent subsequent to the respective heating operations and may be blow-molded. The inner surface of the tube is then coated with phosphor. A protective coating of e.g., silicon dioxide may, if required, be applied before applying the phosphor. After application of the phosphor coating, en electrode system each, comprising two lead-in wires and the incandescent coil supported thereon, is inserted into the external tube ends. In addition, at one or both tube ends, an exhaust tube is inserted. Subsequently, the tube ends are heated to softening temperature and a pinch seal is provided about the electrode inleads and the exhaust tube which may be present. The discharge envelope is then evacuated as usual, via the exhaust tube or tubes, flushed with rare gas, and filled with mercury and a rare gas as a starting gas.

DRAWINGS

FIG. 2b is a side view of the based low-pressure discharge lamp of FIG. 2a taken at 90° with respect to FIG. 2a;

Figures 1A, 1B:
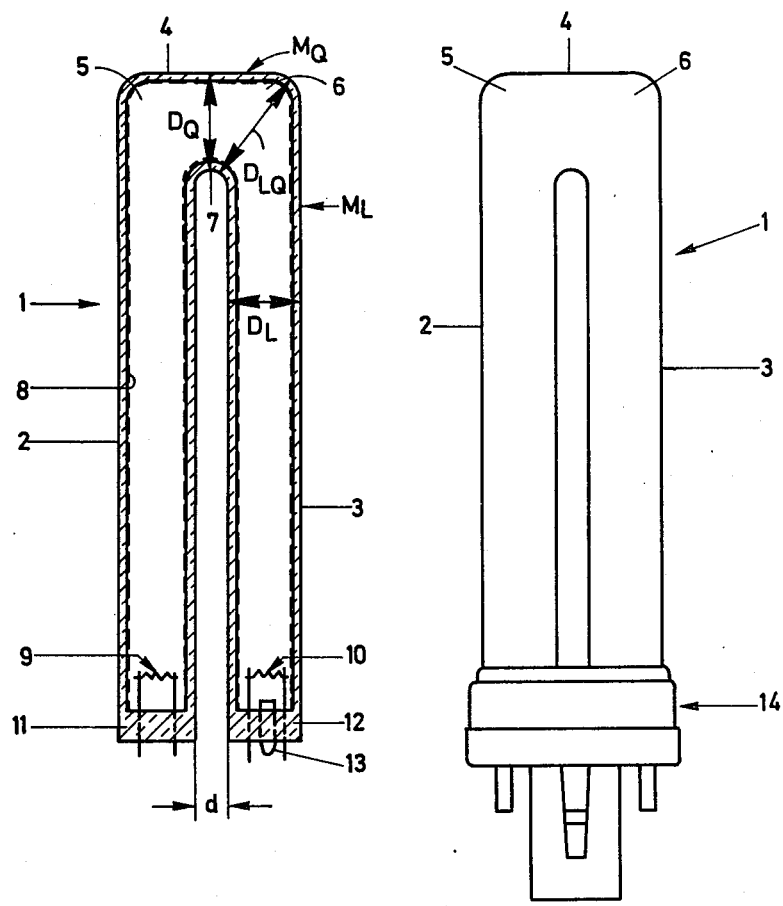
FIG. 1a is a diagrammatic sectional illustration of a low-pressure discharge lamp with a discharge tube bent once without base.
FIG. 1b is a side view of a low-pressure discharge lamp in accordance with FIG. 1a with based ends attached.

The tubular discharge envelope 1 shown in FIG. 1a comprises the two longitudinal tube sections 2, 3 and the transverse tube section 4. The U-shaped bend of the discharge tube 1 is so designed that the outer generating line $M_Q$ of the transverse tube section 4 is straight and extends substantially perpendicular to the outer generating lines $M_L$ of the two longitudinal tube sections 2, 3. The diameter $D_L$ of the respective longitudinal tube sections 2, 3 is 12 mm; the diameter $D_Q$ of the transverse tube section 4 in its center is so selected that a ratio of $D_Q/D_L$ of about 1.2 results. Further, the tube transition between the longitudinal tube sections 2, 3 and the transverse tube section 4 is such that the ratio of the diameter $D_{LQ}$ in the respective tube bend to the diameter $D_Q$ is about 1.2. The cold spots in the outer tube corner bends 5, 6 resulting from this provide in operation of the lamp an optimal mercury vapor pressure of about $8 \cdot 10^{-3}$ mbar. The inner tube bend 7 has a very small radius of curvature so that the clearance d between the two longitudinal tube sections 2, 3 is smaller than 5 mm. A relatively compact lamp construction is obtained in spite of a single-piece discharge tube 1. The inner surface of the tubular discharge envelope 1 is provided with a phosphor coating 8; a customary three-line phosphor has been used for this purpose. A protective coating of silicon dioxide is applied between the inner envelope wall of the discharge tube 1 and the phosphor 8. Electrode systems 9, 10 are sealed in the two ends of the discharge tube 1 by means of the pinch seals 11, 12. One of the tube ends is provided with a tipped-off exhaust tube 13. As a filling, the discharge tube 1 contains mercury in an amount of about 10 mg and 3 mbar argon as a starting gas. The length of this U-shaped lamp bent once in the case of a 9W-embodiment is 140 mm, the overall width is below 28 mm. U-shaped lamps of other power ratings have different lengths. The low-pressure mercury vapor discharge lamp of FIG. 1a is illustrated in FIG. 1b with a base 14 mounted thereto which can be of any suitable and standard construction and thus is shown only schematically. A glow switch starter with an appropriate anti radio noise interference capacitor (not shown) is located in the interior of the base 14.

Figure 2A:
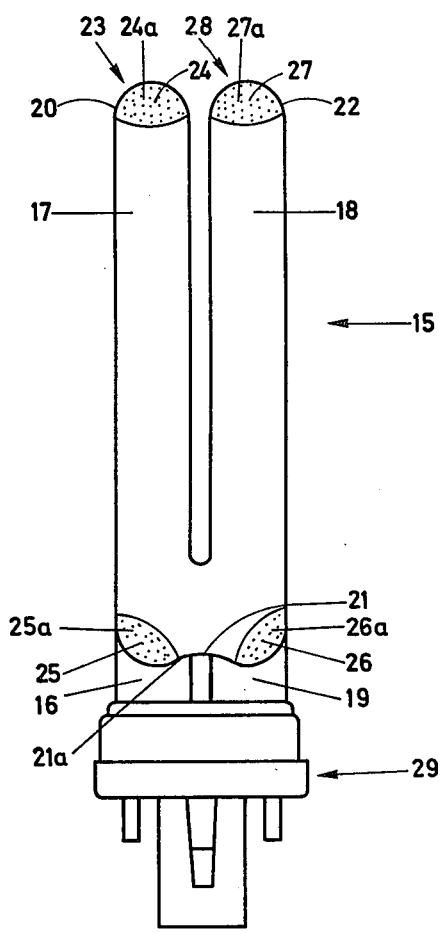
FIG. 2a is a side view of a low-pressure discharge lamp, with base, with a discharge tube bent several times.
Figure 2B:
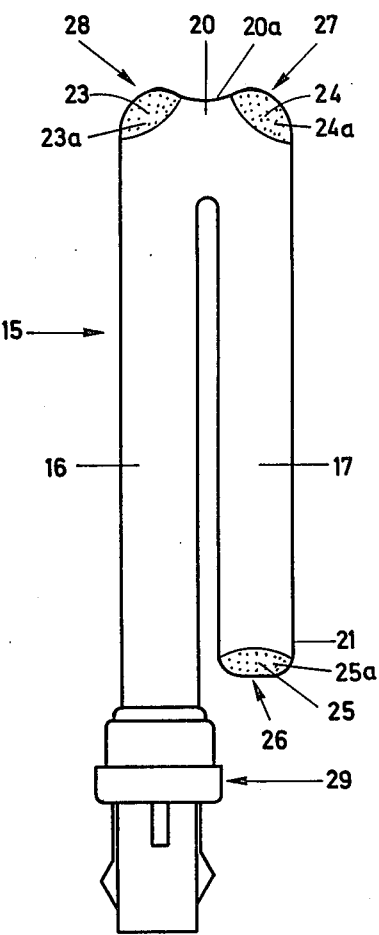

The FIGS. 2a and 2b show the embodiment of a low-pressure mercury vapor discharge lamp bent several times in which the initially U-shaped discharge tube 15 is folded and re-folded. The discharge tube 15 comprises the four longitudinal tube sections 16, 17, 18, 19 and the three transverse tube sections 20, 21, 22. The three U-bends which are thus formed all have the U-bend configuration described in detail of FIG. 1a and have the approximately rectangular portions 23, 24, 25, 26, 27, 28. The coldest spot of the discharge envelope 15 in this arrangement will be one of the bends 23, 24, 27, 28. The longitudinal tube sections 16, 17, 18, 19 are so arranged that they intersect the angles of a square in individual cross-sectional planes. It is also conceivable to arrange the tube sections in a meander-type pattern.

The discharge tube 15 bent several times is provided with a base member 29 at its sealed outer ends. The relationships of diameters and dimensions of this lamp correspond to the lamp described in FIGS. 1a and 1b.

Figure 3:
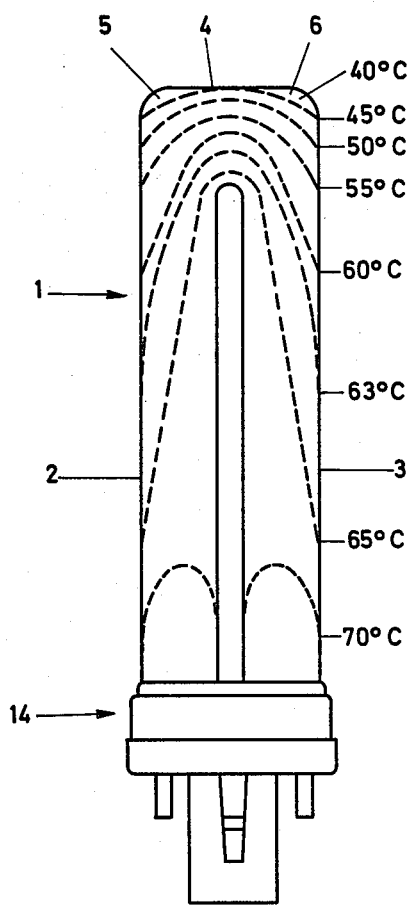
FIG. 3 shows the temperature profile of a low-pressure discharge lamp in accordance with FIGS. 1a and 1b, respectively, wherein isotherms are shown in broken lines.

FIG. 3 shows the temperature profile of a U-shaped lamp of FIGS. 1a and 1b bent once, at vertical operating position—base down—and an ambient temperature of about 25° C. This illustrates clearly that the cold spots which determine the mercury vapor pressure in operation of the lamp are located directly in the approximately rectangular tube corners 5 and 6, where the temperature is about 40° C. The temperature values then increase towards the sealed ends containing the electrodes to about 70° C. In the middle of the transverse tube section 4, the temperature is about 5° C. higher than at the cold spots, and thus will be about 45° C.).

The coldest spots can be extended, thus somewhat distoring the diagram of FIG. 3, by forming a depression at the outer surface of the transverse tube section, with respect to the outer generating line $M_Q$ (FIG. 1). Such depressions are schematically indicated at 20a, 21a in FIGS. 2a, 2b. Additional cooling can be obtained by locating substances capable of better heat radiation than the glass walls of the tube envelope in the corners, as schematically shown at 23a, 24a, 25a, 26a, 27a for example. Heat dissipating coatings 23a, 24a, 25a, 26a, 27a are located at the transition between the longitudinal tube sections and the respective transverse tube sections, to dissipate heat at a temperature above 35° C., and which have a better heat dissipating characteristic than the glass of the discharge vessel 1, 15.

A suitable coating material is, for instance, colloidal graphite (such as is available from Riedel-de Haën under the trade name Hydrokollag) or a lacquer of carbonyl iron powder and tricobalt-tetroxide (such as is known from the German Patent Disclosure Document DE-OS No. 21 36 012). The coating is applied at a thickness of from about 0.05 to 0.5 mm, preferably at a thickness of 0.2 mm.

We claim:

1. A low-pressure mercury vapor discharge lamp having a discharge envelope (1; 15) formed of a single-piece glass tube bent at least once to define at least two straight, parallel longitudinal tube sections (2, 3; 16, 17, 18, 19) of essentially identical diameter dimensions (DL) and at least one transverse tube section (4; 20, 21, 22) connecting individual longitudinal tube sections;
   a fluorescent coating on said longitudinal tube sections and on at least one transverse tube section;
   the two outer ends of the discharge envelope being sealed and including electrodes sealed therein;
   and a mercury-containing gas fill in said envelope,
   wherein, in accordance with the invention,
   the envelope is shaped and arranged to provide, in operation of the lamp, cold spots controlling the operating pressure of the fill in the envelope,
   said envelope being formed and shaped to define an outer generating line $M_Q$ of the individual transverse tube sections (4; 20, 21, 22) which is substantially straight;
   a diameter $D_{LQ}$ in the tube bends (5, 6; 23, 24, 25, 26, 27, 28) at the transition between the longitudinal tube sections (2, 3; 16, 17, 18, 19) and the respective transverse tube section (4; 20, 21, 22) which is larger than the diameter $D_Q$ of the individual transverse tube section in the middle thereof,
   and a diameter $D_Q$ of the transverse tube section which is at least as large as the diameter $D_L$ of the longitudinal tube sections.

2. A low-pressure mercury vapor discharge lamp as claimed in claim 1, wherein the outer generating line $M_Q$ of the individual transverse tube sections is substantially perpendicular to the outer generating lines $M_L$ of the associated longitudinal tube sections.

3. A low-pressure mercury vapor discharge lamp as claimed in claim 1 or 2, wherein the ratio of the diameter $D_Q$ of the transverse tube sections to the diameter $D_L$ of the longitudinal tube sections is 1.1 to 1.3.

4. A low-pressure mercury vapor discharge lamp as claimed in claim 1 or 2, wherein the ratio of the diameter $D_{LQ}$ at the tube transitions to the diameter $D_Q$ of the transverse tube sections is about 1.2.

5. A low-pressure mercury vapor discharge lamp as claimed in claim 1, wherein the clearance d between adjacent longitudinal tube sections which are connected by a transverse tube section is about as large as or smaller than the half diameter $D_L$ of these tube sections.

6. A low-pressure mercury vapor discharge lamp as claimed in claim 1, wherein a depression (20a, 21a) is formed with respect to the outer generating $M_Q$ at the center of the outer surface of the transverse tube section (4; 20, 21, 22).

7. A low-pressure mercury vapor discharge lamp as claimed in claim 1, wherein the discharge envelope (1) comprises two longitudinal tube sections (2, 3) and a transverse tube section (4) connecting the longitudinal tube sections.

8. A low-pressure mercury vapor discharge lamp as claimed in claim 1, wherein the discharge envelope (15) comprises four longitudinal tube sections (16, 17, 18, 19) and three transverse tube sections (20, 21, 22) connecting the longitudinal tube sections.

9. A low-pressure mercury vapor discharge lamp as claimed in claim 8, wherein the four longitudinal tube sections (16, 17, 18, 19) intersect the angles of a square in individual cross-sectional planes,
   the first (16) and the second (17) longitudinal tubes are connected at the ends remote from the envelope seals, the second (17) and the third (18) longitudinal tubes are connected at the ends adjacent the envelope seals, and the third (18) and the fourth (19) longitudinal tubes are again connected at the ends remote from the envelope seals by the respective transverse tube sections (20, 21, 22).

10. A low-pressure mercury vapor discharge lamp as claimed in claim 1, including a coating (23a, 24a, 25a, 26a, 27a) located in a zone adjacent the transitions between the longitudinal tube sections and the respective transverse tube section, which coating dissipate heat in the temperature range above 35° C. better than the glass material of the discharge envelope (1; 15).

11. A fluorescent lamp as claimed in claim 1, wherein a protective coating is located between the wall of the discharge envelope and the fluorescent coating (8).

12. A fluorescent lamp as claimed in claim 11, wherein the protective coating comprises a coating of silicon dioxide, located between the wall of the discharge envelope and the fluorescent coating.

13. A fluorescent lamp as claimed in claim 1, wherein the outer ends of the tubular discharge envelope (1; 15) are provided with pinch seals (11, 12).

14. A method of manufacturing a low-pressure mercury vapor discharge lamp as claimed in claim 1 comprising the steps of:

(a) heating at least an intermediate portion of an initially straight glass tube to softening temperature;
(b) bending towards one another the tube sections which extend at the sides of the respective intermediate portion until they are aligned parallel to one another to form a U-bend portion;
(c) inserting the U-shaped bend portion of the tube including substantially the transverse tube section with the transition to the respective longitudinal tube sections into a mold;
(d) blowing gas into the tube through the tube ends to effect a blow-molding step;
(e) applying a phosphor coating interiorly within the tube;
(f) inserting an electrode system into the outer tube ends;
(g) heating the tube ends to softening temperature and subsequent pinch-sealing of the ends about the electrode system; and
(h) evacuating, flushing and filling the discharge envelope.

15. A method as claimed in claim 14, including the steps, between steps (d) and (e), of:
(j) heating further intermediate portions of the tube and bending towards one another the longitudinal tube sections extending at the sides of the respective intermediate portions until they are also aligned parallel to one another to form further U-bend portions; and
(k) inserting the further U-shaped bend portions of the tube, including the transverse tube sections with the transitions to the respective longitudinal tube sections into a mold, and blowing gas into the tube through the tube ends.

16. Method according to claim 14, wherein the gas blowing step is carried out simultaneously with the step of inserting the U-bend in the mold.

17. Method according to claim 15, wherein the gas blowing step is carried out simultaneously with the step of inserting the U-bend in the mold.

18. Method according to claim 14, including the step, after step (d), of applying a protective coating to the inner surface of the tube;
and wherein the phosphor coating application step comprises applying the phosphor coating over the protective coating.

19. Method according to claim 15, including the step, after step (k), of applying a protective coating to the inner surface of the tube;
and wherein the phosphor application step comprises applying the phosphor coating over the protective coating.

20. Method according to claim 18, wherein the gas blowing step is carried out simultaneously with the step of inserting the U-bend in the mold.

* * * * *